(12) United States Patent
Mori

(10) Patent No.: US 12,217,541 B2
(45) Date of Patent: *Feb. 4, 2025

(54) ELECTRONIC APPARATUS AND METHOD FOR CONTROLLING THE SAME

(71) Applicant: CANON KABUSHIKI KAISHA, Tokyo (JP)

(72) Inventor: Naomi Mori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/499,961

(22) Filed: Nov. 1, 2023

(65) Prior Publication Data

US 2024/0062583 A1 Feb. 22, 2024

Related U.S. Application Data

(63) Continuation of application No. 17/374,788, filed on Jul. 13, 2021, now Pat. No. 11,837,022.

(30) Foreign Application Priority Data

Jul. 15, 2020 (JP) .................................. 2020-121212

(51) Int. Cl.
*G06V 40/18* (2022.01)
*G06F 3/01* (2006.01)

(52) U.S. Cl.
CPC ............... *G06V 40/18* (2022.01); *G06F 3/013* (2013.01); *G03B 2213/025* (2013.01)

(58) Field of Classification Search
CPC .... G06V 40/18; G06F 3/013; G03B 2213/025

USPC .......................................................... 382/103
See application file for complete search history.

(56) References Cited

U.S. PATENT DOCUMENTS

2016/0202756 A1* 7/2016 Wu ........................ G06F 3/0304
382/103

FOREIGN PATENT DOCUMENTS

| EP | 3608755 A1 * | 2/2020 | ............ G06F 17/17 |
|----|-------------|--------|------------------------|
| JP | H0938039 A | 2/1997 | |
| JP | 2008072674 A | 3/2008 | |
| JP | 2014110562 A | 6/2014 | |

* cited by examiner

*Primary Examiner* — Gabriel I Garcia
(74) *Attorney, Agent, or Firm* — Canon U.S.A., Inc., IP Division

(57) ABSTRACT

An electronic apparatus includes a control unit that performs control to acquire first orientation information indicating a first orientation of the body and first line-of-sight information about the user's line-of-sight, of a case where a first eye tracking calibration display is displayed on the screen, acquire second orientation information indicating a second orientation of the body different from the first orientation and second line-of-sight information about the user's line-of-sight, of a case where a second eye tracking calibration display is displayed on the screen, and cause, in a case where the second orientation information is different from the first orientation information, the screen to display a predetermined display that prompts the user to change the orientation of the body to the first orientation.

13 Claims, 8 Drawing Sheets

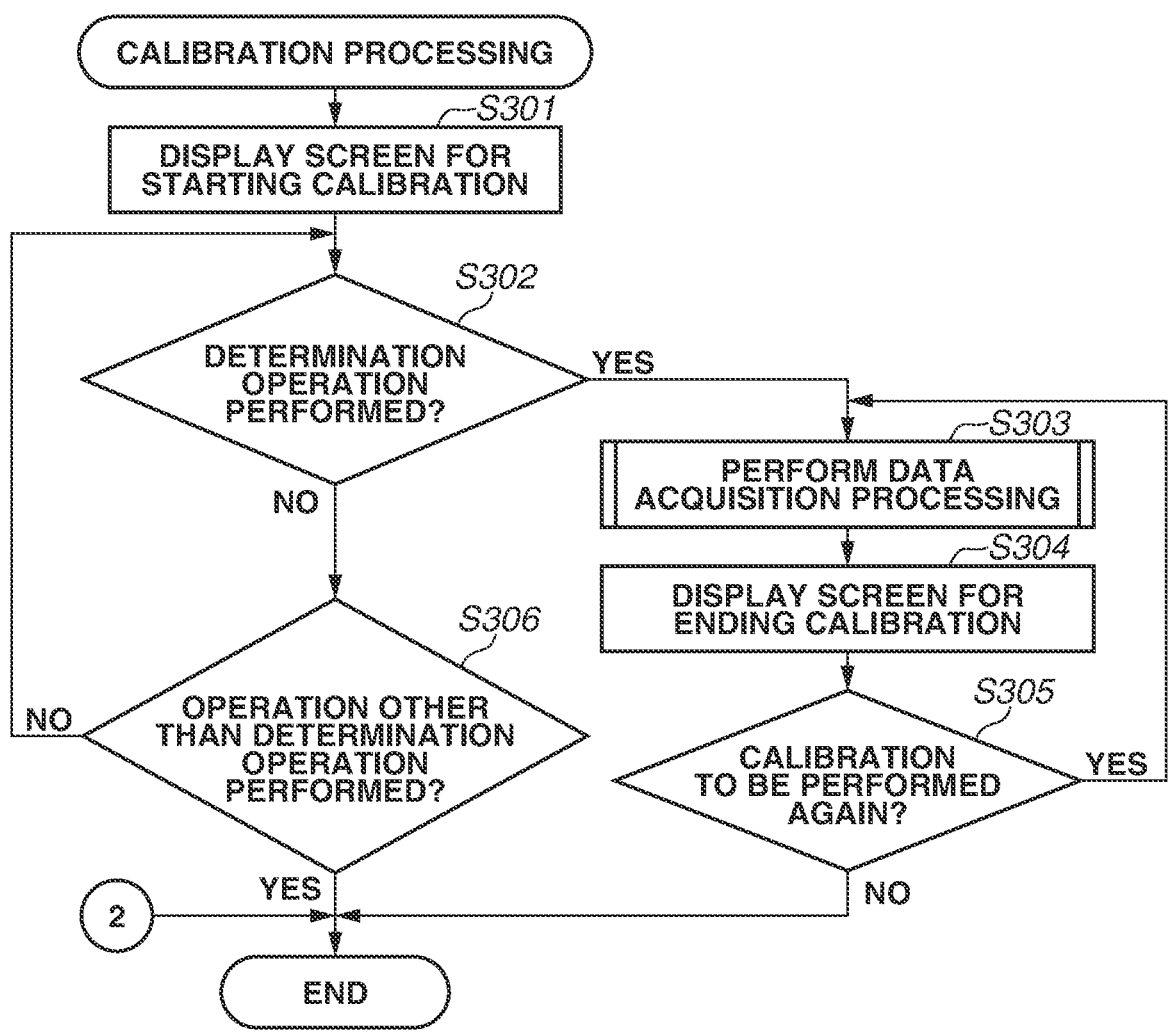

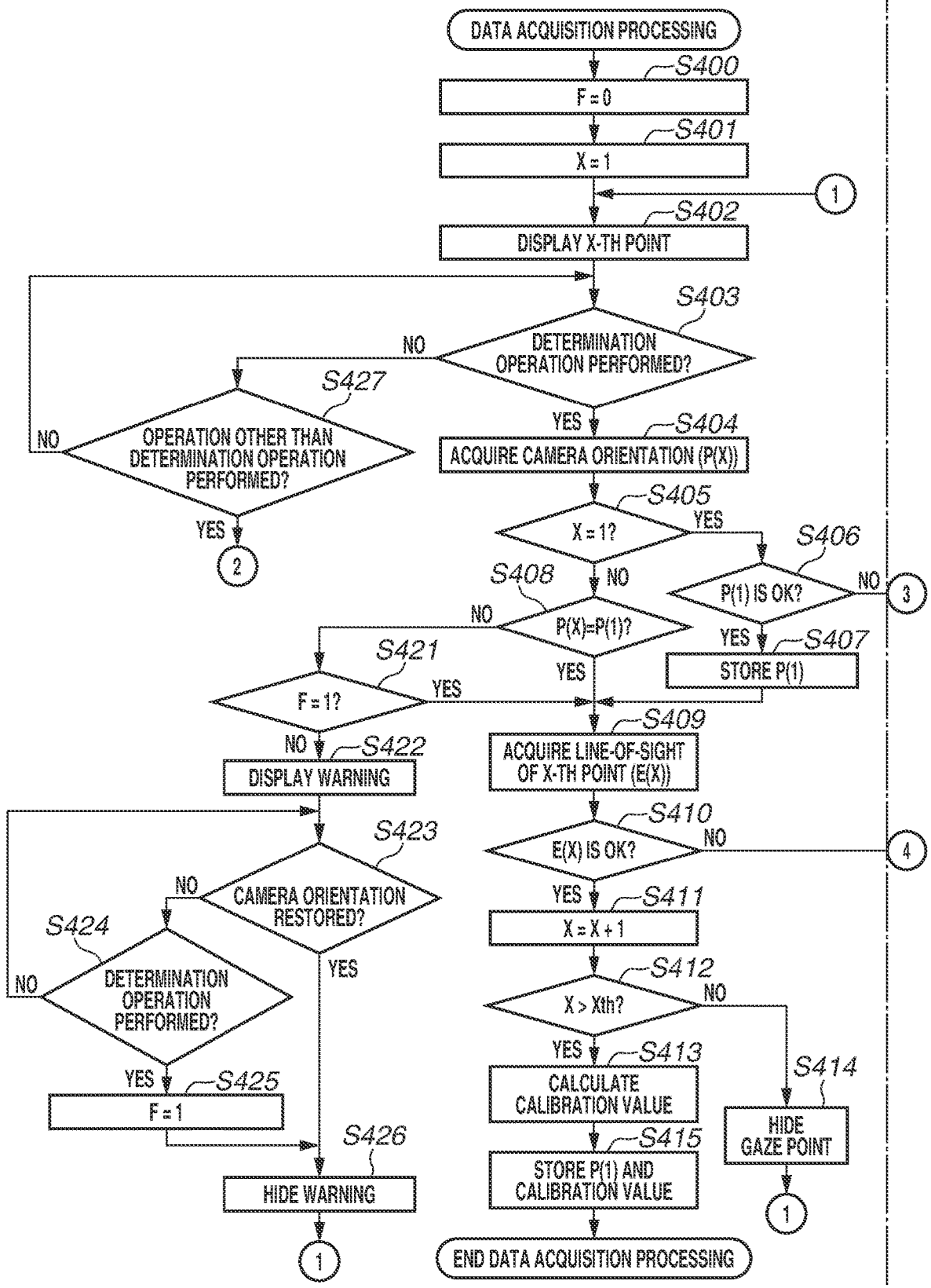

ELECTRONIC APPARATUS AND METHOD FOR CONTROLLING THE SAME

CROSS-REFERENCE TO RELATED APPLICATIONS

This application is a Continuation of U.S. patent application Ser. No. 17/374,788 filed Jul. 13, 2021, which claims priority benefit of Japanese Application No. 2020-121212 filed Jul. 15, 2020. The disclosures of the above-named applications are hereby incorporated by reference herein in their entireties.

BACKGROUND

Field

The present disclosure relates to an electronic apparatus capable of a line-of-sight input by a user's line-of-sight and a method for controlling the electronic apparatus.

Description of the Related Art

A conventional camera is known to detect a line-of-sight of a photographer (user), detect a position (region) in a finder of the camera currently being gazed by the photographer, and control an imaging function, such as automatic focus adjustment. However, accuracy of the user's line-of-sight detection depends on a pupil diameter of a user's eye, how the user looks into the finder, and an ambient brightness. Therefore, it is necessary to acquire the user's line-of-sight as data and then perform eye tracking calibration to obtain a calibration value for calculating a user's line-of-sight position, i.e., the position currently being gazed by the user. Performing calibration reduces a difference between a position currently being gazed by the user and a calculated line-of-sight position corresponding to the user's line-of-sight. This enables the user to specify a position and execute a function by using the line-of-sight without feeling a sense of strangeness. Japanese Patent Application Laid-Open No. 07-255676 discusses a technique for detecting an orientation (horizontal or vertical position) of an optical apparatus at the start of calibration, and storing a calibration value calculated based on the detected orientation and user's line-of-sight information (line-of-sight data), as calibration data.

However, in a case where line-of-sight data as a plurality of pieces of line-of-sight information for generating calibration data is acquired, the technique disclosed in Japanese Patent Application Laid-Open No. 07-255676 acquires only an orientation of the optical apparatus at the start of calibration. For each of a plurality of detection points, the technique does not consider each orientation of the optical apparatus for the second and subsequent detection points at timings of acquiring the line-of-sight data. If an orientation of the optical apparatus at a timing of acquiring line-of-sight data for the first point (index 1) is different from an orientation of the optical apparatus at a timing of acquiring line-of-sight data for the second point (index 2), accuracy of the line-of-sight data will be degraded. This accuracy degradation affects calibration data including a calibration value to be calculated. This causes a difference between the position currently being gazed by the user and the line-of-sight position corresponding to the user's line-of-sight.

SUMMARY

Various embodiments of the present disclosure provide for generating calibration data having higher accuracy.

According to various embodiments of the present disclosure, an electronic apparatus includes a detection unit configured to detect an orientation of a body including an acquisition unit, and at least one memory and at least one processor which function as an acquisition unit configured to acquire information about a user's line-of-sight to a screen, and a control unit configured to perform control to execute an eye tracking calibration, based on the acquired information about the user's line-of-sight, wherein the control unit performs control to acquire first orientation information indicating a first orientation of the body and a first line-of-sight information about the user's line-of-sight, of a case where a first eye tracking calibration display is displayed on the screen, acquire second orientation information indicating a second orientation of the body and a second line-of-sight information about the user's line-of-sight, of a case where a second eye tracking calibration display is displayed on the screen, and cause, in a case where the second orientation information is different from the first orientation information, the screen to display a predetermined display that prompts the user to change the orientation of the body to the first orientation.

Further features of the present disclosure will become apparent from the following description of exemplary embodiments with reference to the attached drawings.

BRIEF DESCRIPTION OF THE DRAWINGS

FIG. 3 is a control flowchart illustrating calibration processing according to one embodiment.

FIGS. 4A and 4B are control flowcharts illustrating data acquisition processing in the calibration processing according to one embodiment.

DESCRIPTION OF THE EMBODIMENTS

An exemplary embodiment of the present disclosure will be described in detail below with reference to the accompanying drawings.

It is to be noted that the following exemplary embodiment is merely one example for implementing the present invention and can be appropriately modified or changed depending on individual constructions and various conditions of apparatuses to which embodiments of the present invention are applied. Thus, the present invention is in no way limited to the following exemplary embodiment.

Figure 1A:
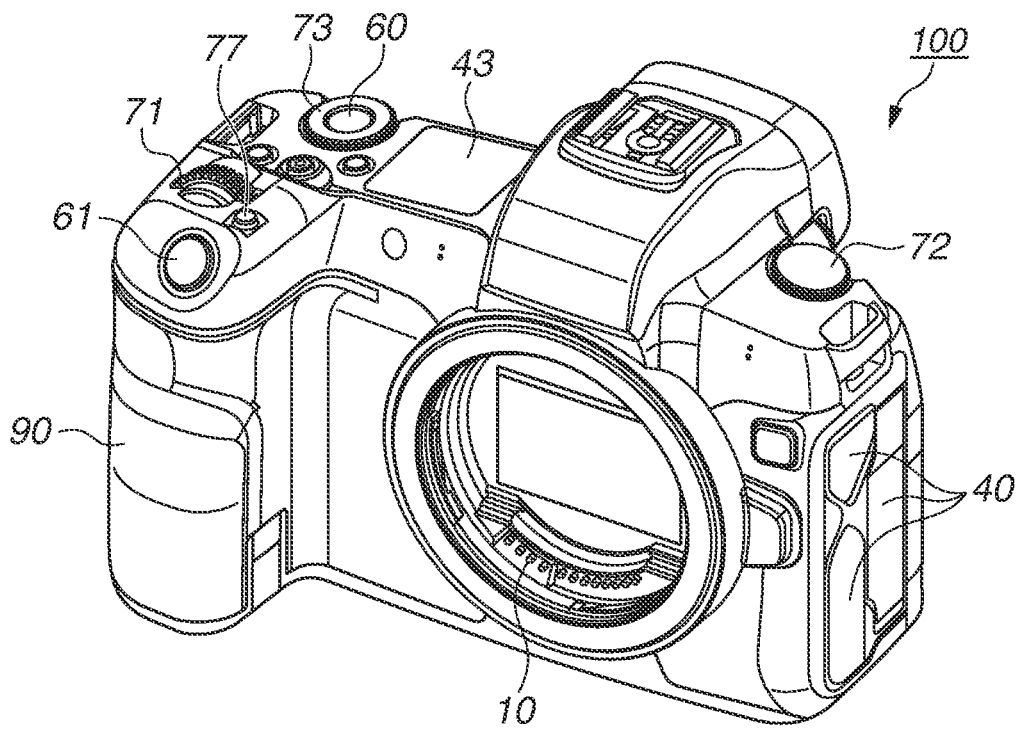
FIGS. 1A and 1B are diagrams each illustrating an outer appearance of a digital camera according to one embodiment.
Figure 1B:
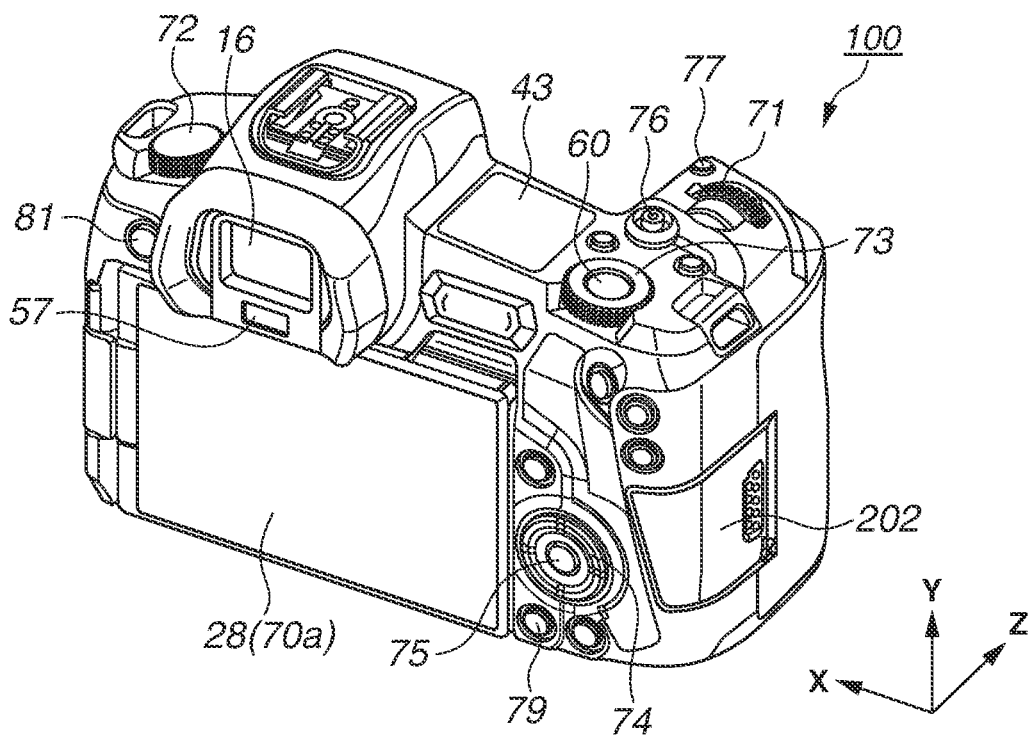

FIGS. 1A and 1B are diagrams each illustrating an outer appearance of a digital camera 100 as an example of an apparatus (electronic apparatus) to which various embodiments of the present disclosure can be applied. FIG. 1A is a perspective view illustrating a front face of the digital camera 100, and FIG. 1B is a perspective view illustrating a rear face of the digital camera 100. Referring to FIGS. 1A and 1B, a display unit 28 is disposed on the rear face of the digital camera 100 to display images and various information. A touch panel 70a is a touch operation member for detecting a touch operation on a display surface (operation surface) of the display unit 28. An outside-finder liquid crystal display unit 43 disposed on a top face of the digital camera 100 displays various setting values of the camera including a shutter speed and an aperture value.

A shutter button 61 is an operation member for issuing an image capturing instruction. A mode selection switch 60 is an operation member for selecting various modes. Terminal covers 40 protect connectors (not illustrated) each for connecting a connection cable from an external apparatus to the digital camera 100. A main electronic dial 71 included in an operation unit 70 is a rotary operation member that is used (turned) to change setting values, such as a shutter speed and an aperture value. A power switch 72 included in the operation unit 70 is an operation member for turning power of the digital camera 100 ON and OFF. A sub electronic dial 73 included in the operation unit 70 is a rotary operation member for moving a selection frame and feeding images. A cross key 74 included in the operation unit 70 is an operation member having buttons that can be pressed in four different directions. The cross key 74 is to enable operations each corresponding to a different one of pressed directions to be executed. A SET button 75 included in the operation unit 70 is a push button mainly used to determine a selection item. A moving image button 76 included in the operation unit 70 is an operation member that is used to issue instructions for starting and stopping moving image capturing (recording).

An M-Fn button 77 included in the operation unit 70 is used (pressed) in an image capturing standby state to quickly change various settings, such as the white balance and ISO sensitivity. The M-Fn button 77 can be assigned various functions as well as the image capturing standby state by a user. The M-Fn button 77 can be assigned a line-of-sight input function. In the image capturing standby state, for example, the line-of-sight input function can be turned ON or OFF by pressing the M-Fn button 77. The M-Fn button 77 is also used during eye tracking calibration for more accurate detection of a position currently being gazed by the user, by using a line-of-sight detection block 160 (described below). In a case where the user gazes a certain gaze point in a calibration display currently displayed and presses the M-Fn button 77, the pressing of the M-Fn button 77 functions as a determination operation. Calibration will be described in detail below.

A playback button 79 included in the operation unit 70 switches between an image capturing mode and a playback mode. In a case where the user presses the playback button 79 in the image capturing mode, the digital camera 100 enters the playback mode and the latest image among images recorded in a recording medium 200 can be displayed on the display unit 28. A menu button 81 included in the operation unit 70 is used (pressed) to display a menu screen on the display unit 28 on which the user can perform various settings. The user can intuitively perform various settings by using the menu screen displayed on the display unit 28, the cross key 74, and the SET button 75.

A communication terminal 10 is used by the digital camera 100 to communicate with a lens unit 150 attachable to and detachable from the digital camera 100 (described below). An eyepiece 16 is an eyepiece member of an eyepiece finder (look-in finder) of the digital camera 100. The user can visually recognize an image displayed in an Electric View Finder (EVF) 29 provided inside the finder through the eyepiece 16. In a case where an optical image of a subject (subject image) can be captured through the lens unit 150, the user can visually recognize an optical image (subject image) of the subject by using the internal optical finder through the eyepiece 16. An eye-contact detection unit 57 is an eye-contact detection sensor for detecting whether the user's eye is in contact with the eyepiece 16. A cover 202 covers a slot that stores the recording medium 200. A grip portion 90 has a shape that is easily gripped with a user's right hand when the user holds the digital camera 100. The shutter button 61 and the main electronic dial 71 are disposed at positions where an operation can be performed by a forefinger of the user's right hand in a state where the user holds the digital camera 100 by gripping the grip portion 90 with a little finger, a third finger, and a middle finger of the user's right hand. The sub electronic dial 73 is disposed at a position where an operation can be performed by a thumb of the user's right hand in the same state.

Figure 2:
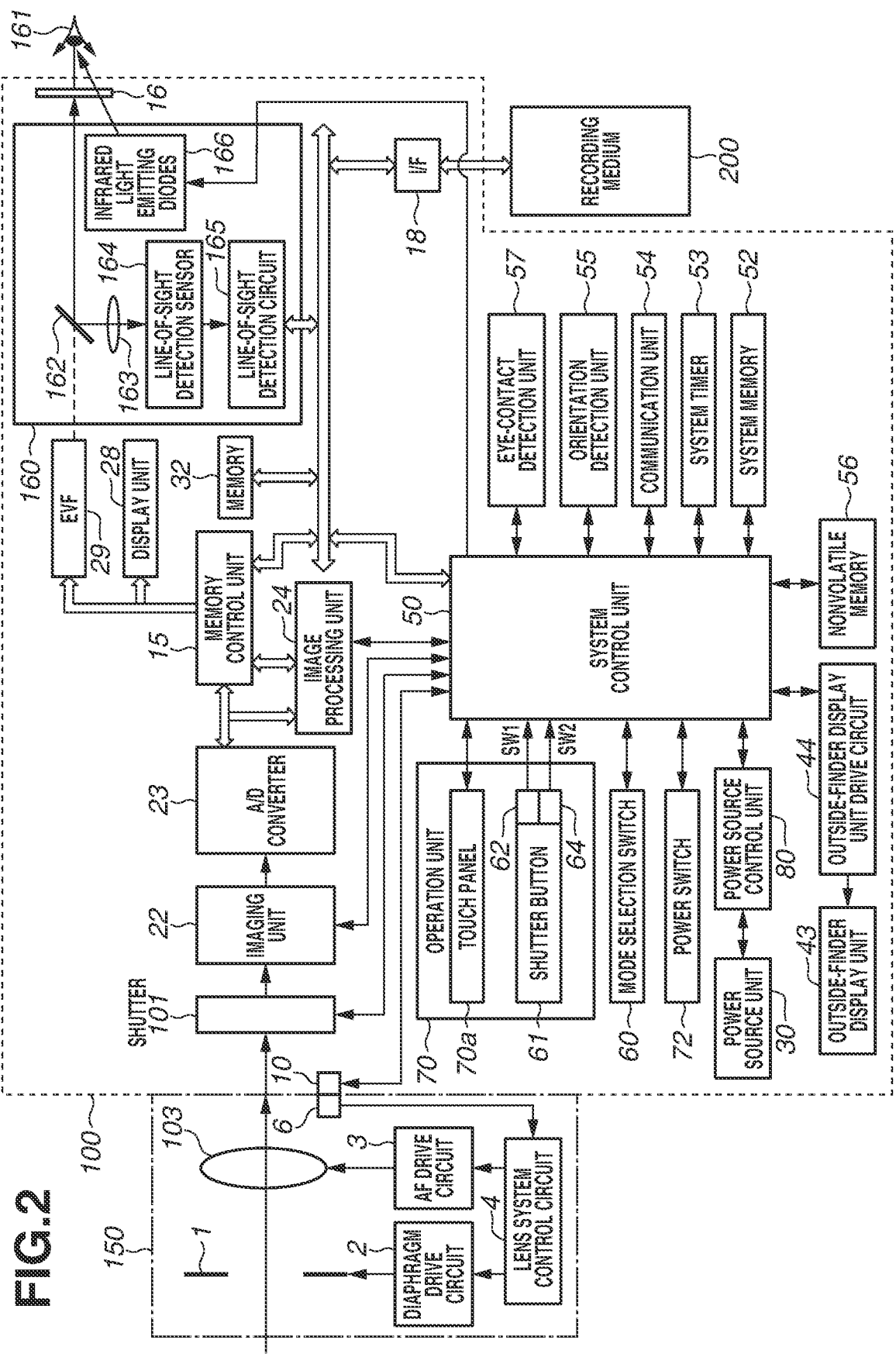
FIG. 2 is a block diagram illustrating a configuration of the digital camera according to one embodiment.

FIG. 2 is a block diagram illustrating an example configuration of the digital camera 100 and the lens unit 150 as an electronic apparatus according to the present exemplary embodiment. Referring to FIG. 2, the lens unit 150 mounts an interchangeable imaging lens to capture a subject image. While a lens 103 normally includes a plurality of lenses, FIG. 2 illustrates a single lens as the lens 103 for simplification. A communication terminal 6 is used by the lens unit 150 to communicate with the digital camera 100. The lens unit 150 communicates with a system control unit 50 via the communication terminal 6 and the above-described communication terminal 10. A lens system control circuit 4 controls a diaphragm 1 via a diaphragm drive circuit 2. The lens system control circuit 4 focuses on the subject by displacing the lens 103 via an Automatic Focus (AF) drive circuit 3.

A shutter 101 is a focal plane shutter capable of freely controlling an exposure time of an imaging unit 22 under control of the system control unit 50.

The imaging unit 22 is an image sensor including a Charge Coupled Device (CCD) or Complementary Metal Oxide Semiconductor (CMOS) sensor for conversing an optical image into an electrical signal. An analog-to-digital (A/D) converter 23 converts the analog signal output from the imaging unit 22 into a digital signal.

An image processing unit 24 subjects data from the A/D converter 23 or data from a memory control unit 15 to predetermined pixel interpolation, resizing processing, such as reduction, and color conversion processing. The image processing unit 24 also performs predetermined calculation processing by using captured image data. The system control unit 50 performs exposure control and distance measurement control, based on the calculation result obtained by the image processing unit 24. This enables the digital camera 100 to perform AF processing, Automatic Exposure (AE) processing, and Electronic Flash Preliminary Emission (EF) processing based on the Through-The-Lens (TTL) method. The image processing unit 24 also performs predetermined calculation processing by using the captured image data and performs TTL-based Automatic White Balance (AWB) processing, based on the obtained calculation result.

The memory control unit 15 controls data communication between the A/D converter 23, the image processing unit 24, and a memory 32. Data output from the A/D converter 23 is written in the memory 32 via the image processing unit 24 and the memory control unit 15 or directly written in the memory 32 via the memory control unit 15. The memory 32 stores image data captured by the imaging unit 22 and converted into digital data by the A/D converter 23, and image data to be displayed on the display unit 28 and the EVF 29. The memory 32 is provided with a sufficient storage capacity to store a predetermined number of still images, and moving images and sound for a predetermined time period.

The memory 32 also serves as an image display memory (video memory). The display image data written in the memory 32 is displayed on the display unit 28 and the EVF 29 via the memory control unit 15. The display unit 28 and the EVF 29 display data on a liquid crystal display (LCD) or an organic electroluminescence display according to a signal from the memory control unit 15. Live view display (LV display) can be performed by successively transferring data A/D-converted by the A/D converter 23 and stored in the memory 32, to the display unit 28 or the EVF 29. Hereinafter, an image displayed in the live view is referred to as a live view image (LV image).

A system timer 53 is a time measurement unit for measuring time to be used for various control and time of a built-in clock.

The mode selection switch 60, a first shutter switch 62, a second shutter switch 64, and the operation unit 70 are operation members for inputting various operation instructions to the system control unit 50. The mode selection switch 60 switches an operation mode of the system control unit 50 between a still image capturing mode, a moving image capturing mode, and a playback mode. The still image capturing mode includes an automatic image capturing mode, an automatic scene determination mode, a manual mode, a diaphragm priority mode (Av mode), a shutter speed priority mode (Tv mode), and a program AE mode (P mode). The still image capturing mode further includes various scene modes as imaging settings each for a different image capturing scene, a custom mode, and the like. The mode selection switch 60 enables the user to directly select any one of these modes. Alternatively, the mode selection switch 60 may display an image capturing mode list screen, and the user may select any one of the plurality of displayed modes and change the mode by using other operation members. Likewise, the moving image capturing mode may also include a plurality of modes.

The first shutter switch 62 turns ON in the middle of depression of the shutter button 61 provided on the digital camera 100, what is called halfway pressing (image capturing preparation instruction), to generate a first shutter switch signal SW1. The first shutter switch signal SW1 causes the system control unit 50 to start an imaging capturing preparation operation, such as the AF processing, the AE processing, the AWB processing, and the EF processing.

The second shutter switch 64 turns ON upon completion of an operation of the shutter button 61, what is called full pressing (image capturing instruction), to generate a second shutter switch signal SW2. Upon issuance of the second shutter switch signal SW2, the system control unit 50 starts a series of operations for imaging processing ranging from reading of a signal from the imaging unit 22 to writing captured image as an image file in the recording medium 200.

The operation unit 70 includes various operation members as input units for receiving operations from the user. The operation unit 70 includes at least the following operation members: the shutter button 61, the touch panel 70a, the main electronic dial 71, the power switch 72, the sub electronic dial 73, the cross key 74, the SET button 75, the moving image button 76, the M-Fn button 77, the playback button 79, and the menu button 81.

The touch panel 70a and the display unit 28 can be integrally formed. For example, the touch panel 70a is configured to be a panel having light-transmissivity which does not disturb display on the display unit 28 and is disposed on an upper layer of the display surface of the display unit 28. Then, input coordinates on the touch panel 79a are associated with display coordinates on the display screen of the display unit 28. This enables providing such a graphical user interface (GUI) that virtually allows the user to directly operate the screen displayed on the display unit 28. The system control unit 50 can detect the following operations on the touch panel 70a and states thereof.

An operation to start touching the touch panel 70a with a finger or a pen that has not been in contact with the touch panel 70a (hereinafter referred to as a "touch-down")

A state where the finger or the pen is in contact with the touch panel 70a (hereinafter referred to as a "touch-on")

An operation to move the finger or the pen while in contact with the touch panel 70a (hereinafter referred to as a "touch-move")

An operation to detach the finger or the pen in contact with the touch panel 70a from the touch panel 70a to end touching (hereinafter referred to as a "touch-up")

A state where the finger or the pen is out of contact with the touch panel 70a (hereinafter referred to as a "touch-off")

When a touch-down is detected, a touch-on is also detected at the same time. After the touch-down, the touch-on is normally kept being detected until a touch-up is detected. A touch-move is detected in a state where the touch-on is detected. Even when the touch-on is detected, a touch-move is not detected if the touch position is not moving. After a touch-up is detected for all of fingers or the pen that have been in contact with the touch panel 70a, a touch-off is detected.

The above-described operations and states as well as position coordinates of a position where a finger or a pen contacts the touch panel 70a are notified to the system control unit 50 via an internal bus. Based on the notified information, the system control unit 50 determines what kind of operation (touch operation) has been performed on the touch panel 70a. For a touch-move, the moving direction of the finger or the pen moving on the touch panel 70a can be determined for each of vertical and horizontal components on the touch panel 70a, based on changes of the position coordinates. In a case where a touch-move by a predetermined distance or longer is detected, the system control unit 50 determines that a slide operation has been performed. An operation to quickly move the finger by a certain distance while in contact with the touch panel 70a and then releasing the finger from the touch panel 70a is referred to as a flick. In other words, a flick is an operation to quickly flip the surface of the touch panel 70a with the finger. In a case where a touch-move at a predetermined speed or higher by a predetermined distance or longer is detected and then a touch-up is subsequently detected, it can be determined that a flick has been performed (a flick has been performed following a slide). A touch operation to simultaneously touch a plurality of positions (for example, two positions) and bring these positions close to each other is referred to as a "pinch-in". A touch operation to move these positions away from each other is referred to as a "pinch-out". A pinch-out and a pinch-in are collectively referred to as a pinch operation (or simply referred to as a "pinch"). The touch panel 70a may be of any one of various types including a resistance film type, a capacitance type, a surface elastic wave type, an infrared type, an electromagnetic induction type, an image recognition type, and an optical sensor type. A touch is detected when the finger or the pen comes into contact with the touch panel 70a or when the finger or the pen comes close to the touch panel 70a depending on the type, and either type is applicable.

A power source control unit 80 including a battery detection circuit, a direct-current to direct-current (DC-DC) converter, and a switch circuit for selecting a block to be supplied with power detects presence or absence of a battery, the battery type, and the remaining battery capacity. The power source control unit 80 also controls the DC-DC converter, based on the detection result and an instruction from the system control unit 50 to supply required voltages to the recording medium 200 and other components for required time periods. A power source unit 30 includes a primary battery (such as an alkaline battery and lithium battery), a secondary battery (such as a NiCd battery, NiMH battery, and Li battery), and an alternating current (AC) adaptor.

A recording medium interface (I/F) 18 is an interface to the recording medium 200, such as a memory card and a hard disk. The recording medium 200 is, for example, a memory card for recording captured images, including a semiconductor memory and a magnetic disk.

A communication unit 54 performs wireless or wire cable connection to transmit and receive an image signal and an audio signal. The communication unit 54 is connectable with a wireless Local Area Network (LAN) and the Internet. The communication unit 54 can communicate with an external apparatus by using Bluetooth® and Bluetooth® Low Energy. The communication unit 54 is able to transmit images (including live view image) captured by the imaging unit 22 and images stored in the recording medium 200, and receive images and other various information from an external apparatus.

A nonvolatile memory 56 is an electrically erasable recordable memory, such as a Flash read only memory (ROM). Constants, programs, and the like for operations of the system control unit 50 are stored in the nonvolatile memory 56. Programs stored in the nonvolatile memory 56 refer to computer programs for executing various flowcharts (described below) according to the present exemplary embodiment.

The system control unit 50 is a control unit including at least one processor or circuit, and controls the entire digital camera 100. Each piece of processing according to the present exemplary embodiment (described below) is implemented when the system control unit 50 executes the above-described programs recorded in the nonvolatile memory 56. A system memory 52 is, for example, a random access memory (RAM). Constants and variables for operations of the system control unit 50 and programs read from the nonvolatile memory 56 are loaded into the system memory 52. The system control unit 50 also performs display control by controlling the memory 32, the display unit 28, and the like.

An orientation detection unit 55 detects information about an orientation of a body of the digital camera 100 in the gravity direction. An acceleration sensor and a gyroscope sensor can be used as the orientation detection unit 55. Motions of the digital camera 100 (pan, tilt, raising, and stand still) can also be detected by using the acceleration sensor and the gyroscope sensor serving as the orientation detection unit 55. Based on the orientation detected by the orientation detection unit 55, the system control unit 50 can determine whether the image captured by the imaging unit 22 is an image captured with the digital camera 100 horizontally held or an image captured with the digital camera 100 vertically held. The system control unit 50 can append orientation information corresponding to an orientation detected by the orientation detection unit 55 to an image file of an image captured by the imaging unit 22 or rotate the image before recording.

In the calibration described below, it is important to grasp a positional relation between the digital camera 100 and an eye 161. Thus, in a case where user's line-of-sight data is acquired as line-of-sight information by the calibration, the system control unit 50 also acquires an orientation of the digital camera 100 detected by the orientation detection unit 55 and stores the acquired orientation as the orientation information. This enables more accurate determining of a line-of-sight position corresponding to a line-of-sight even in a case where the user performs image capturing at various angles.

The line-of-sight detection block 160 detects a line-of-sight of the eye (user's eyeball) 161 in contact with the eyepiece 16. The line-of-sight detection block 160 includes a dichroic mirror 162, an imaging lens 163, a line-of-sight detection sensor 164, infrared emitting diodes 166, and a line-of-sight detection circuit 165.

The infrared emitting diodes 166 serve as light emitting elements for detecting a user's line-of-sight in the inside-finder display unit and irradiate the eye (user's eyeball) 161 in contact with the eyepiece 16 with infrared light. The infrared light emitted from the infrared emitting diodes 166 is reflected on the eye (user's eyeball) 161 and the reflected infrared light reaches the dichroic mirror 162. The dichroic mirror 162 reflects only infrared light and transmits visible light. The reflected infrared light with the changed optical path forms an image on an imaging plane of the line-of-sight detection sensor 164 via the imaging lens 163. The imaging lens 163 is an optical member that configures a line-of-sight detection optical system. The line-of-sight detection sensor 164 includes an imaging device, such as a CCD image sensor.

The line-of-sight detection sensor 164 electrically converts the incident infrared reflected light into an electrical signal and outputs the electrical signal to the line-of-sight detection circuit 165. The line-of-sight detection circuit 165 including at least one processor detects the user's line-of-sight from an image or movement of the eye (user's eyeball) 161, based on a signal output from the line-of-sight detection sensor 164, and outputs detection information to the system control unit 50.

According to various embodiments of the present disclosure, a line-of-sight is detected based on a method called a cornea reflection method by using the line-of-sight detection block 160. The cornea reflection method detects an orientation and a position of a line-of-sight, based on a positional relation between reflected light (infrared light emitted from the infrared emitting diodes 166 and reflected by a cornea of the eye (eyeball) 161) and a pupil of the eye (eyeball) 161. Other various methods for detecting an orientation and a position of a line-of-sight include a sclera reflection method that utilizes a difference in light reflectance between black and white eye regions. Other methods for detecting a line-of-sight are also applicable as long as the orientation and position of a line-of-sight can be detected.

The user's line-of-sight detected in the line-of-sight detection block 160 is used by the digital camera 100, for example, as a function of displaying an AF frame at the line-of-sight position corresponding to the user's line-ofsight and performing AF. The AF frame moves following a movement of a user's line-of-sight, and thus it is possible to constantly perform AF at a line-of-sight position corresponding to the user's line-of-sight. This method is also applicable not only to AF but also to AE and AWB. This method accumulates information about which subject and how long the user gazed the subject during image capturing and stores the information together with images, whereby it becomes possible to propose diverse functions corresponding to the line-of-sight position and accumulated time information corresponding to the user's line-of-sight at the playback time. Other than examples of the digital camera 100, a certain Head Mount Display (HMD) increases resolution centering on a line-of-sight position corresponding to a user's line-of-sight, and decreases the resolution with increasing distance from the line-of-sight position corresponding to the user's line-of-sight. Certain augmented reality (AR) glasses display detailed information for a building or an advertisement existing ahead of a user's line-of-sight.

Eye tracking calibration refers to a calibration step for detecting a user's line-of-sight by using the line-of-sight detection block 160 and more exactly determining a line-of-sight position corresponding to the user's line-of-sight. The line-of-sight detection block 160 is configured to detect a user's line-of-sight and determine a line-of-sight position corresponding to the line-of-sight, even without performing the calibration. However, since human eye structures including eyelids have individual differences, it is sometimes difficult to determine a line-of-sight position corresponding to a user's line-of-sight. Performing calibration enables acquiring line-of-sight data serving as the line-of-sight information specific to the user using the digital camera 100. A line-of-sight position corresponding to a line-of-sight input by the user can be more exactly determined by calculating a calibration value, based on acquired line-of-sight data specific to the user. A more accurate calibration value can be acquired by performing the calibration a plurality number of times. Calibration values applicable to diverse situations can be acquired by performing the calibration in various situations, for example, under bright natural light, under a fluorescent light, in a dark place, and in a state where glasses are put on. In a case where line-of-sight detection is performed in various orientations, as is the case with the digital camera 100 according to the present exemplary embodiment, the positional relation between the EVF 29 of the digital camera 100 and the eye 161 may be changed by change in a user's state of looking into the EVF 29. If the positional relation between the line-of-sight detection block 160 and the eye 161 is changed during execution of the calibration, the line-of-sight data serving as the line-of-sight information to be acquired largely changes, which results in a deviation from the calibration value. Therefore, it is desirable to perform the calibration for each individual orientation and not desirable that the orientation changes during the calibration.

Figure 6A:
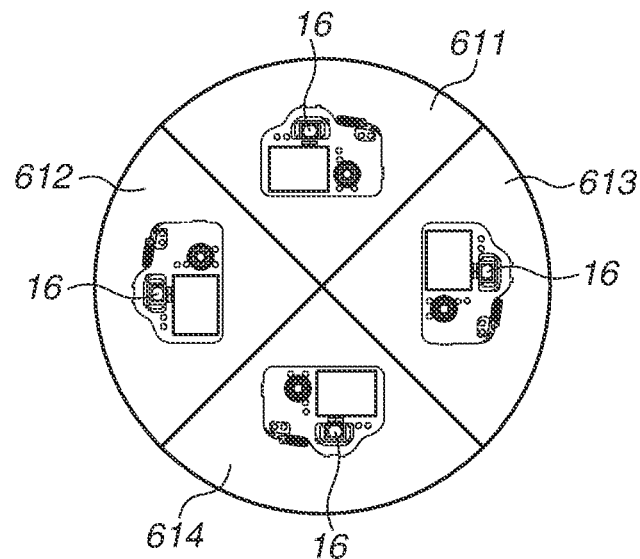
FIGS. 6A to 6C are diagrams illustrating orientations of the digital camera in the data acquisition processing and positional relations between a line-of-sight detection block and an eye according to one embodiment.
Figure 6B:
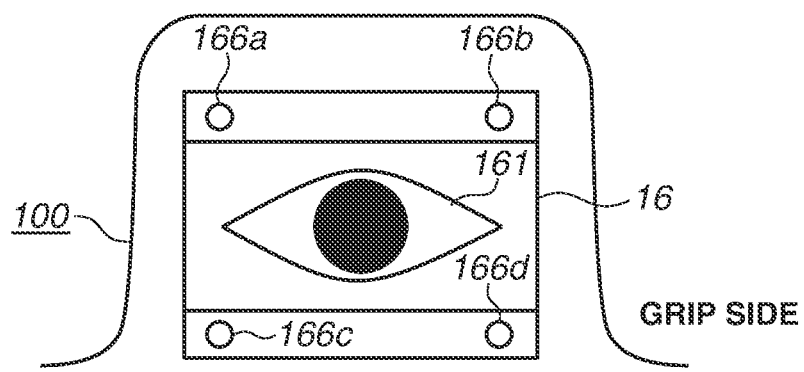
Figure 6C:
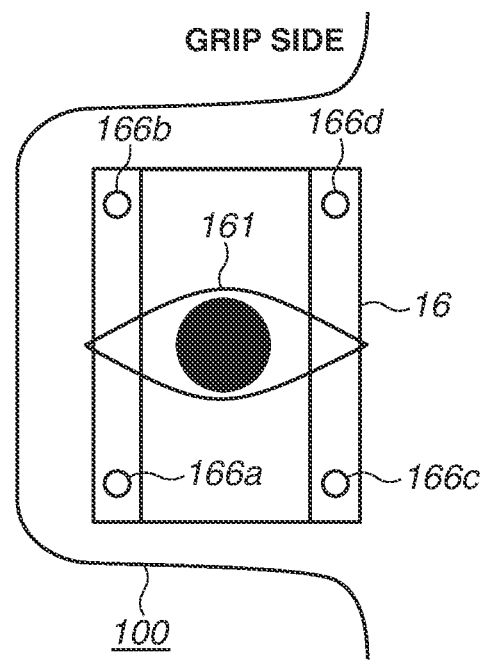

Orientations of the digital camera 100, and relative positional relations between the line-of-sight detection block 160 and the eye 161 are illustrated in FIGS. 6A to 6C. FIG. 6A illustrates four different categories of orientations of the digital camera 100. The orientations of the body of the digital camera 100 are classified into the following four categories (positions).

When the eyepiece 16 is in a range of an area 611 (horizontal normal position).
When the eyepiece 16 is in a range of an area 612 (left vertical position).
When the eyepiece 16 is in a range of an area 613 (right vertical position).
When the eyepiece 16 is positioned in a range of an area 614 (horizontal reverse position)

FIGS. 6B and 6C illustrate positional relations between the infrared emitting diodes 166 and the eye 161 in a state where the user's eye is in proximity to the eyepiece 16. According to the present exemplary embodiment, the infrared emitting diodes 166 (diodes 166a to 166d) are disposed at four different positions inside the eyepiece 16, as illustrated in FIG. 6B. As described above, the positional relation between the line-of-sight detection block 160 and the eye 161, i.e., the relative positional relations between the infrared emitting diodes 166 and the eye 161, affects a line-of-sight data to be acquired.

In a case of the digital camera 100, when the eye of the user standing upright is in proximity to the eyepiece 16 of the digital camera 100, a change in the orientation of the digital camera 100 changes the relative positional relations between the infrared emitting diodes 166 (line-of-sight detection block 160) and the eye 161. More specifically, the orientation of the digital camera 100 indicates the relative positional relation between the line-of-sight detection block 160 and the eye 161.

FIG. 6B illustrates the positional relations between the infrared emitting diodes 166 (diodes 166a to 166d) and the eye 161 in a state where the digital camera 100 is held at the horizontal normal position. The diodes 166a and 166b emit infrared light from the upper eyelid side of the eye 161, and the diodes 166c and 166d emit infrared light from the lower eyelid side of the eye 161.

FIG. 6C illustrates the positional relations between the infrared emitting diodes 166 (diodes 166a to 166d) and the eye 161 in a state where the digital camera 100 is held at the left vertical position. The diodes 166b and 166d emit infrared light from the upper eyelid side of the eye 161, and the diodes 166a and 166c emit infrared light from the lower eyelid side of the eye 161.

In a state where the digital camera 100 is held at the right vertical position (not illustrated), the diodes 166a and 166c emit infrared light from the upper eyelid side of the eye 161, and the diodes 166b and 166d emit infrared light from the lower eyelid side of the eye 161. In a state where the digital camera 100 is held at the horizontal reverse position (not illustrated), the diodes 166c and 166d emit infrared light from the upper eyelid side of the eye 161, and the diodes 166a and 166b emit infrared light from the lower eyelid side of the eye 161.

Referring to FIG. 6A, while each of the areas 611 to 614 has an angular range of 90 degrees (360 degrees are divided into quarters), the angular range may be different for each area.

In common practice of the calibration, a plurality of gaze points is disposed at different display positions, line-of-sight data when the user gases each gaze point is acquired and accumulated, and a calibration value is calculated based on the plurality of line-of-sight data pieces. In this case, since the plurality of gaze points is displayed at different positions, the line-of-sight data of the eyeball can be acquired for various angles. If the calculated calibration value is pre-registered as calibration data, the user is able to perform the line-of-sight input with higher accuracy without performing the calibration each time the user uses the line-of-sight input function. According to the present exemplary embodiment, a calibration value calculated based on acquired line-of-sight data and an orientation (orientation information) of the digital camera 100 are stored and registered in an associated way as calibration data.

In a calibration mode, for example, three or five gaze points are known to be displayed. Examples of display forms of these gaze points include the following control method. The plurality of gaze points is sequentially displayed one by one. After acquisition of line-of-sight data for the first gaze point, the first gaze point is hidden and then the second gaze point is displayed. After acquisition of all of line-of-sight data pieces and calculation of a calibration value, the calibration is completed.

At the calibration in the calibration mode, the user is required to gaze each gaze point since an unstable line-of-sight is undesired. For example, in a control method in which only the first gaze point is displayed and then the second gaze point is displayed while the first one remains displayed, the user may unconsciously move the line-of-sight between the first and the second gaze points, which results in an unstable line-of-sight. Therefore, it is more desirable that the plurality of gaze points is sequentially displayed one by one, and line-of-sight data corresponding to each gaze point is acquired.

In control in the calibration mode according to the present exemplary embodiment, line-of-sight data at a total of five gaze points is acquired, and the gaze points are sequentially displayed one by one. After acquisition of line-of-sight data for one gaze point, the gaze point is hidden and then the following gaze point is displayed.

The eye-contact detection unit 57 is an eye-contact detection sensor that detects the state where the eye (object) 161 is coming closer to (coming into contact with) the eyepiece 16 of the finder (eye-proximity state) and the state where the eye 161 is being detached from (coming out of contact with) the eyepiece 16 of the finder (eye out-of-proximity state). The system control unit 50 turns display of the display unit 28 and the EVF 29 ON (display state) or OFF (not display state) according to the state detected by the eye-contact detection unit 57. More specifically, at least in a case where the digital camera 100 is in the image capturing standby state and in a case where automatic changeover setting is made for the display destination of a live view image captured by the imaging unit 22, the following display control is performed. In the eye out-of-proximity state, the display unit 28 is set as the display destination, i.e., the display of the display unit 28 is turned ON and the display of the EVF 29 is turned OFF. In the eye-proximity state, on the other hand, the EVF 29 is set as the display destination, i.e., the display of the EVF 29 is turned ON and the display of the display unit 28 is turned OFF.

The eye-contact detection unit 57 can use, for example, an infrared proximity sensor for detecting a state where a certain object is coming closer to the eyepiece 16 of the finder including the EVF 29. In a case where an object comes close to the eyepiece 16, infrared light emitted from the light projecting portion (not illustrated) of the eye-contact detection unit 57 is reflected and then received by the light receiving portion (not illustrated) of the infrared light proximity sensor. The eye-contact detection unit 57 can also determine a distance (eye-contact distance) from the eyepiece 16 to the object, based on the amount of the received infrared light. In this way, the eye-contact detection unit 57 performs eye-contact detection for detecting the eye-contact distance from the object to the eyepiece 16.

According to the present exemplary embodiment, the light projecting portion and the light receiving portion of the eye-contact detection unit 57 are devices different from the infrared emitting diodes 166 and the line-of-sight detection sensor 164, respectively. However, the infrared emitting diodes 166 may also serve as the light projecting portion of the eye-contact detection unit 57, and the line-of-sight detection sensor 164 may serve as the light receiving portion.

In a case where an object coming closer to the eyepiece 16 at a predetermined distance or less is detected in the eye out-of-proximity state (non-proximity state), the eye-contact detection unit 57 determines the eye-proximity state. In a case where an object in the eye-proximity state (proximity state) has been detached from the eyepiece 16 by a predetermined distance or longer, the eye-contact detection unit 57 determines the eye out-of-proximity state. A threshold value for detecting the eye-proximity state and a threshold value for detecting the eye out-of-proximity state may be different, for example, by providing a hysteresis. Once the eye-proximity state is detected, the eye-proximity state continues until the eye out-of-proximity state is detected. Once the eye out-of-proximity state is detected, the eye out-of-proximity state continues until the eye-proximity state is detected. The infrared proximity sensor is an example of the eye-contact detection unit 57. Other sensors capable of detecting approach of an eye or object (with which the eye-proximity state can be determined) may be employed as the eye-contact detection unit 57.

The system control unit 50 can detect the following operations and states, based on the output from the line-of-sight detection block 160.

A state where a new line-of-sight of the user's eye in proximity to the eyepiece 16 is input (detected), i.e., the user starts the line-of-sight input.

A state where the user's eye in proximity to the eyepiece 16 is being subjected to the line-of-sight input.

A state where the user's eye in proximity to the eyepiece 16 is gazing a gaze point.

A state where the user's eye in proximity to the eyepiece 16 shifts the line-of-sight, i.e., the user ends the line-of-sight input.

A state where the user's eye in proximity to the eyepiece 16 is not performing the line-of-sight input.

"Gaze" described above refers to a state where the line-of-sight position corresponding to the user's line-of-sight does not exceed (is equal to or less than) a predetermined moving amount within a predetermined time period.

The present exemplary embodiment will be described below centering on processing for performing the calibration using the user's line-of-sight with the digital camera 100 as an example of an electronic apparatus.

FIG. 3 is a control flowchart illustrating processing that is executed when the user performs eye tracking calibration. This control processing is implemented when the system control unit 50 loads a program stored in the nonvolatile memory 56 into the system memory 52 and then executes the program.

Figure 7:
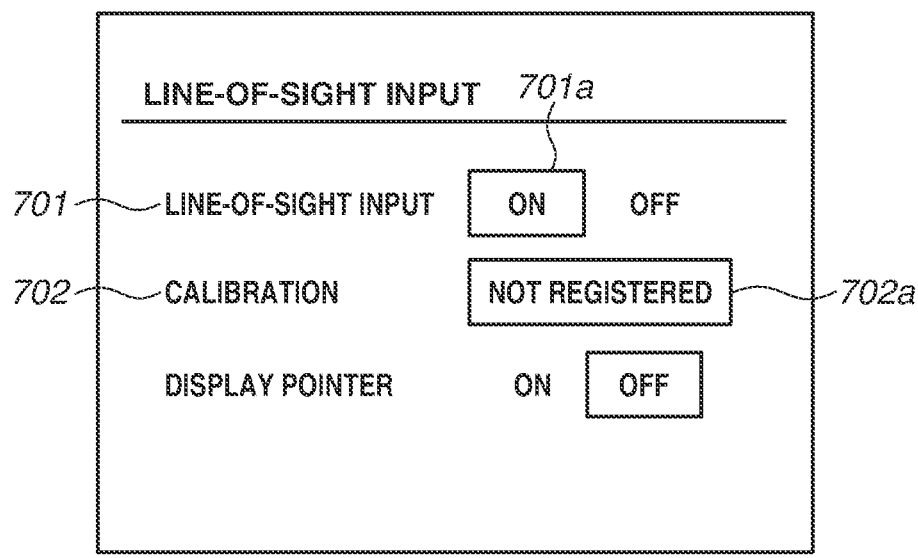
FIG. 7 is a diagram illustrating an example display of a setting screen related to the line-of-sight according to one embodiment.

The flowchart in FIG. 3 is started when the user performs an operation for starting the calibration on a setting menu screen in a state where the digital camera 100 is activated and the user is looking into the finder, i.e., the user's eye is in proximity to the eyepiece 16. FIG. 7 illustrates an example of a setting menu screen for the line-of-sight input function. The line-of-sight input setting as an item 701 in FIG. 7 indicates a state where an option 701a is selected, i.e., the line-of-sight input is set to ON. The flowchart in FIG. 3 is started in a case where an execution instruction is issued for an item 702, i.e., in a case where a display item 702a is selected and determined. Referring to FIG. 7, "Not Registered" is displayed for the display item 702a, which indicates that the user has not performed the calibration. In a case where the user has performed the calibration even at least once, message "Registered" is displayed for the display item 702a. The calibration can be performed as described above when whichever of the messages is displayed for the display item 702a.

Figure 5A:
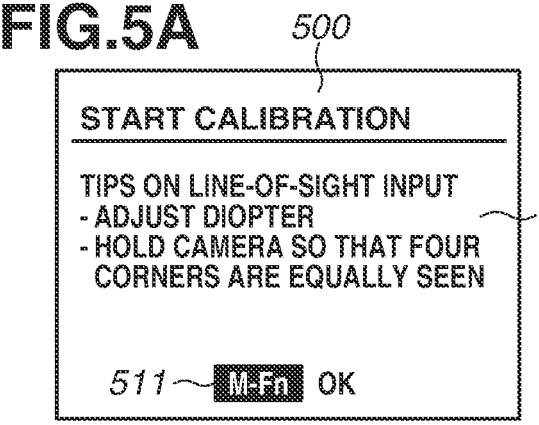
FIGS. 5A to 5H are diagrams illustrating example screens that are displayed at acquiring of line-of-sight data as line-of-sight information according to one embodiment.
Figure 5B:
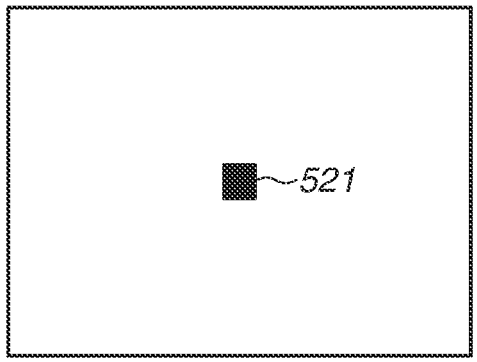
Figure 5C:
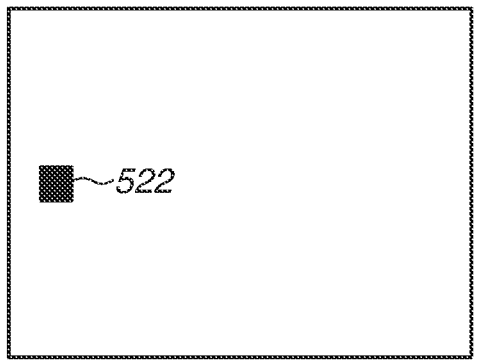
Figure 5D:
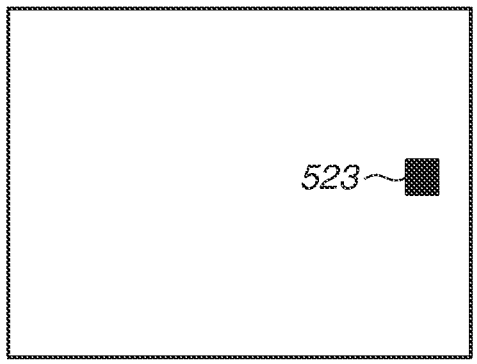
Figure 5E:
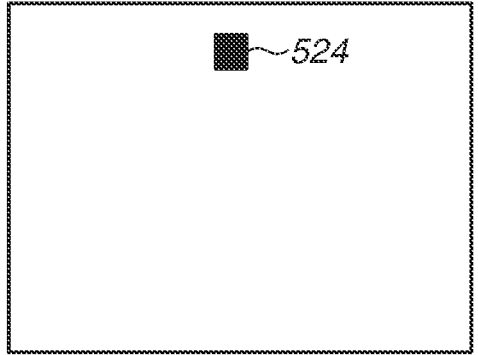
Figure 5F:
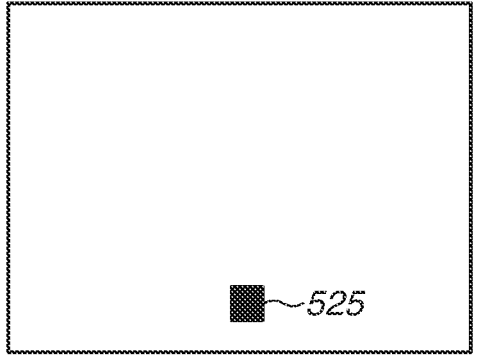

In step S301, the system control unit 50 displays a screen for starting the calibration in the EVF 29. FIG. 5A illustrates an example display of a screen for starting the calibration. The example illustrated in FIG. 5A is displayed in the EVF 29 in a case where the user's eye is in proximity to on the eyepiece 16 and the orientation detection unit 55 detects that the orientation of the digital camera 100 is the horizontal normal position. At the time of user's line-of-sight detection including the calibration, some adjustments is performed by the user to make it easier for the line-of-sight detection block 160 to detect the user's line-of-sight. Therefore, at the start of the calibration, a dialog 501 in FIG. 5A is displayed. Even if the user has not used the line-of-sight input function, displaying a dialog like the dialog 501 makes it easier for the user to grasp tips on the line-of-sight input as well as the calibration. Messages of the dialog 501 are not limited thereto, and the dialog 501 in FIG. 5A may not be displayed. The system control unit 50 may start processing from step S302, skipping step S301, in response to the issuance of an instruction for starting the calibration.

In step S302, the system control unit 50 determines whether a determination operation is performed. In a case where the determination operation is performed (YES in step S302), the processing proceeds to step S303. On the other hand, in a case where the determination operation is not performed (NO in step S302), the processing proceeds to step S306. The determination operation according to the present exemplary embodiment is pressing of the M-Fn button 77 as illustrated by a display item 511 in FIG. 5A. The determination operation is a condition as a declaration of intent by the user to proceed to the following step (screen), and is not limited to pressing of the M-Fn button 77.

In step S303, the system control unit 50 starts processing for acquiring calibration data. The processing for acquiring the calibration data will be described in detail below with reference to the control flowcharts in FIGS. 4A and 4B.

Figure 5G:
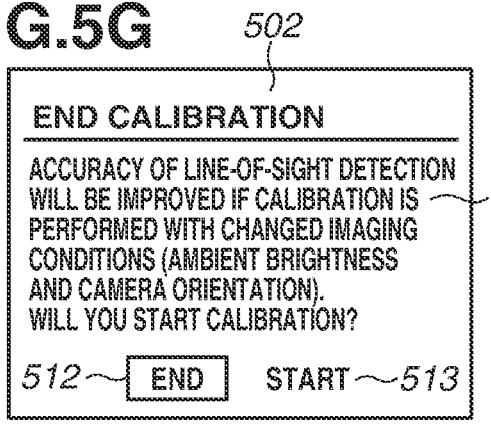

In step S304, the system control unit 50 displays an end message upon completion of the calibration, instead of displaying the gaze points. More specifically, the system control unit 50 displays a dialog 503 and options 512 and 513 as illustrated in FIG. 5G.

In step S305, the system control unit 50 determines whether an instruction for performing the calibration again is issued. In a case where the instruction is issued (YES in step S305), the processing returns to step S400. On the other hand, in a case where the instruction is not issued (NO in step S305), the processing exits the control flowcharts in FIGS. 4A and 4B. The instruction for performing the calibration again refers to selection of the option 513 illustrated in FIG. 5G. In a case where the user selects the option 513, the system control unit 50 performs the calibration again from the beginning. In a case where the user selects the option 512, on the other hand, the system control unit 50 changes the calibration instruction screen to a screen displayed before the user has started calibration, for example, the setting menu screen.

Performing the calibration a plurality of times allows acquisition of calibration data having higher accuracy. Displaying the screen in FIG. 5G allows informing the user of acquisition of calibration data having higher accuracy by performing the calibration a plurality of times, whereby an effect of promoting the user to perform the calibration a plurality of times can be acquired. Upon completion of line-of-sight data acquisition at the five gaze points, the system control unit 50 may end the processing for acquiring calibration data without displaying the dialog 503 illustrated in FIG. 5G. More specifically, the processing may skip steps S304 and S305 and exit the control flowchart in FIG. 3 directly from step S303.

In step S306, the system control unit 50 determines whether an operation other than the determination operation is performed. In a case where an operation other than the determination operation is performed, i.e., an operation is performed on an operation member other than the M-Fn button 77 described in step S302 (YES in step S306), the system control unit 50 ends the calibration processing. On the other hand, in a case where such an operation is not performed (NO in step S306), the processing returns to step S302. In a case where an operation is performed on an operation member other than the M-Fn button 77, the system control unit 50 performs processing corresponding to an operated member. For example, in a case where the user presses the playback button 79, the system control unit 50 transits to playback mode processing to play back an image captured or stored in the recording medium 200. In a case where the user presses the shutter button 61, the system control unit 50 transits to the image capturing standby state as image capturing mode processing, and performs image capturing preparation processing, such as the AF, AE, and AWB processing. When an image capturing instruction is issued, the system control unit 50 performs a series of image capturing processing up to recording of a captured image in the recording medium 200 as an image file.

Figure 4B:
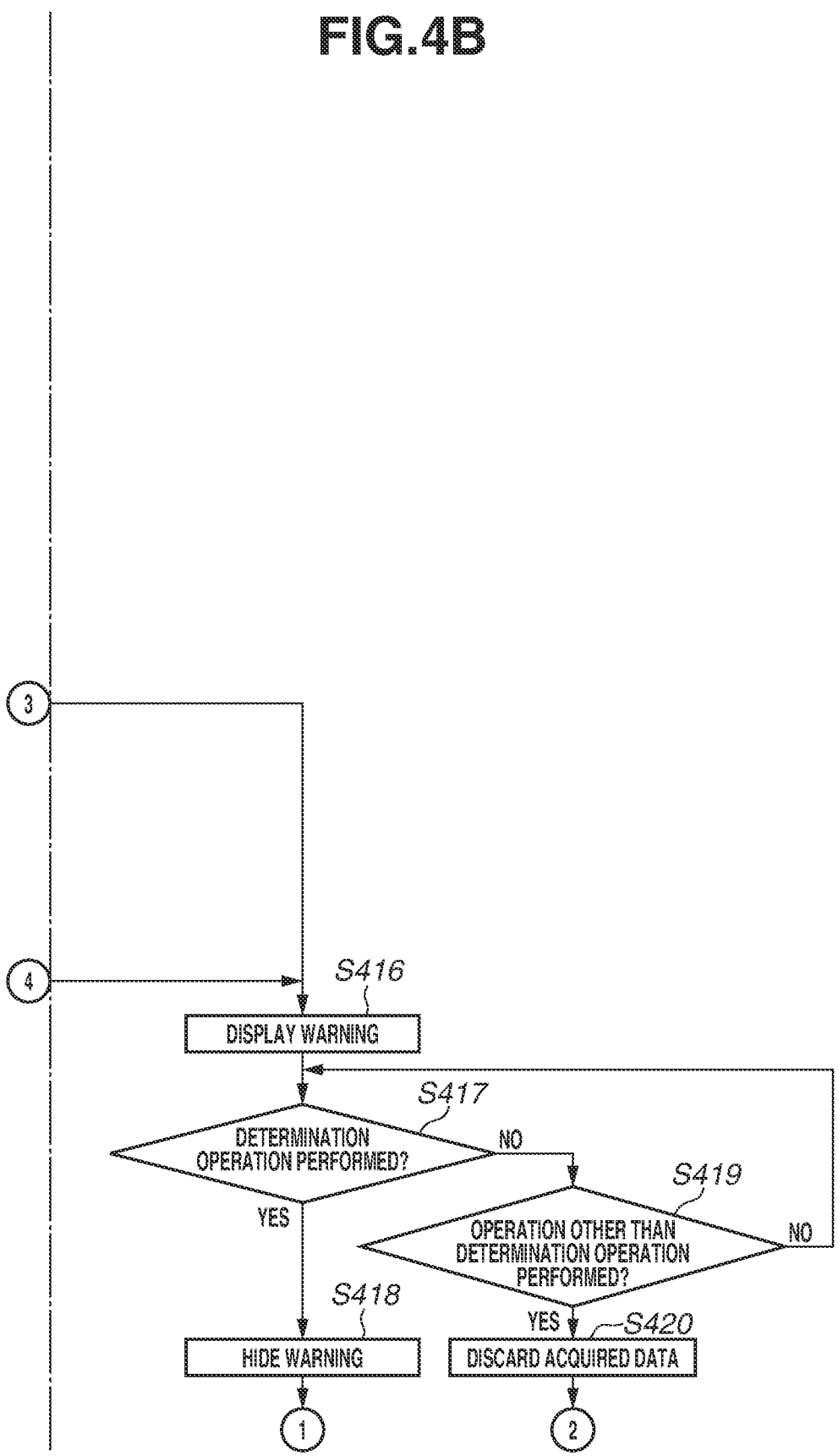

FIGS. 4A and 4B are control flowcharts illustrating processing for acquiring the calibration data explained in step S303 in FIG. 3. When the determination operation is performed (YES in step S302), the system control unit 50 starts the processing for acquiring the calibration data.

In step S400, the system control unit 50 initializes flag information F (F=0) and stores the flag information F in the system memory 52. The flag information F indicates whether to permit an orientation change during execution of the calibration. In a case where the flag information F is 0, the system control unit 50 notifies the user that the orientation has changed during execution of the calibration. The flag information F will be described in detail below.

In step S401, the system control unit 50 sets a variable X to 1 (X=1) and stores the variable X in the system memory 52. According to the present exemplary embodiment, the variable X denotes the number of gaze points to be displayed in the EVF 29.

In step S402, the system control unit 50 refers to the nonvolatile memory 56 and displays the X-th gaze point as calibration display in the EVF 29. A plurality of calibration images associated with an orientation of the digital camera 100 and display order (X) is prestored in the nonvolatile memory 56. In a case where the digital camera 100 is at a horizontal position (normal position), the system control unit 50 displays a gaze point 521 in FIG. 5B (X=1), a gaze point 522 in FIG. 5C (X=2), a gaze point 523 in FIG. 5D (X=3), a gaze point 524 in FIG. 5E (X=4), and a gaze point 525 in FIG. 5F (X=5) in the EVF 29. More specifically, these gaze points are displayed at the center, left, right, top, and bottom positions in this order when viewed from the user. This display order is determined in consideration of stability of the user's line-of-sight. As described above, instead of sequentially displaying the gaze points one by one as illustrated in FIG. 5A to 5H, the system control unit 50 may display all of the five gaze points in the EVF 29 and then sequentially hide the five gaze points one by one. More specifically, the system control unit 50 may sequentially hide the gaze points from the one determined to have been gazed by the user (the line-of-sight data has been acquired). Then, the system control unit 50 may ends the control flowcharts in FIGS. 4A and 4B upon completion of the line-of-sight data acquisition for the last gaze point.

For example, if a gaze point is displayed at the bottom of the EVF 29 and then displayed at the top, the user needs to move the line-of-sight from the bottom to upward. This may possibly degrade stability of the line-of-sight because of the characteristics of the human eye. For this reason, in a state where the eyepiece 16 is on the left side and the grip portion 90 is at the top (left vertical position), the gaze points are displayed at positions illustrated in FIGS. 5B, 5E, 5F, 5D, and 5C in this order so that their relative positions in the EVF 29 change in order of the center, left, right, top, and bottom positions. In a state where the eyepiece 16 is on the right side and the grip portion 90 is at the bottom (right vertical position), the gaze points are displayed at positions illustrated in FIGS. 5B, 5F, 5E, 5C, and 5D in this order.

More specifically, the gaze points are relatively displayed at the center, left, right, top, and bottom positions in this order when viewed from user, regardless of the orientation of the digital camera 100. While, in the display form according to the present exemplary embodiment, the system control unit 50 displays the gaze points in the above-described order, i.e., the display order changes according to the orientation of the digital camera 100, embodiments of the present invention are not limited thereto. The number of gaze points is not limited thereto but may be four (top, bottom, left, and right), three (top, lower left, and lower right), or other numbers.

In step S403, like step S302, the system control unit 50 determines whether the determination operation is performed. In a case where the determination operation is performed (YES in step S403), the processing proceeds to step S404. On the other hand, in a case where the determination operation is not performed (NO in step S403), the processing proceeds to step S427.

In step S404, the system control unit 50 determines orientation information P(X) of when the determination operation is performed in step S403, as the orientation of the digital camera 100. As described above, the orientation of the digital camera 100 is constantly being detected by the orientation detection unit 55. However, the system control unit 50 determines the orientation of when the determination operation as a declaration of intent by the user is performed, as the orientation of the digital camera 100.

In step S405, the system control unit 50 determines whether the variable X is 1. In a case where the variable X is 1 (YES in step S405), the processing proceeds to step S406. On the other hand, in a case where the variable X is not 1 (NO in step S405), the processing proceeds to step S408.

In step S406, the system control unit 50 determines whether the orientation information P(X) for the digital camera 100 determined in step S404 is an orientation that is registerable as calibration data. In a case where the orientation information P(X) is determined to be a registerable orientation (YES in step S406), the processing proceeds to step S407. On the other hand, in a case where the orientation information P(X) is determined to be an unregisterable orientation (NO in step S406), the processing proceeds to step S416.

The orientations that can be registered as calibration data include the horizontal normal position, the left vertical position, and the right vertical position out of the four different orientations illustrated in FIG. 6A. In a case where the orientation of the digital camera 100 is the horizontal reverse position, the orientation cannot be registered as calibration data. This is because image capturing using the line-of-sight input is considered to be unlikely performed in a state where the eyepiece 16 is in the range of the area 614. However, even the horizontal reverse position may be registered as calibration data.

In step S407, the system control unit 50 stores the orientation of the digital camera 100 determined in step S404 as orientation information P(X) in the nonvolatile memory 56. According to the present exemplary embodiment, the system control unit 50 stores in the nonvolatile memory 56 only the orientation of when the determination operation is performed in a state where the first gaze point is displayed.

In a case where the system control unit 50 determines that the variable X is not 1 (NO in step S405), the processing proceeds to step S408. In step S408, the system control unit 50 determines whether the orientation information P(X) of the digital camera 100 is an orientation P(1) of when the determination operation is performed in a state where the first gaze point is displayed. In a case where P(X) is P(1) (YES in step S408), the processing proceeds to step S409. On the other hand, in a case where P(X) is not P(1) (NO in step S408), the processing proceeds to step S421.

In step S409, the system control unit 50 determines line-of-sight data E(X) when the X-th gaze point is displayed. According to the present exemplary embodiment, the user's line-of-sight is constantly being detected by the line-of-sight detection block 160 during the calibration. In step S409, the system control unit 50 determines information about the line-of-sight acquired at a timing of when the determination operation is input in step S403, as line-of-sight data E(X). The reason why the system control unit 50 determines the line-of-sight data acquired at the timing of when the determination operation is performed is to acquire more reliable line-of-sight data. The line-of-sight data may be acquired at a timing of when the system control unit 50 determines that a gaze is detected by the line-of-sight detection block 160, even in a case where the determination operation is not performed. In a case where a gaze is used for the determination operation at the time of calibration data acquisition as in the control flowcharts in FIGS. 4A and 4B, the system control unit 50 may set another condition, which is different from the gaze determination condition, for the time other than calibration data acquisition. For example, at the time other than calibration data acquisition, the system control unit 50 determines that a gaze is detected in a case where the moving amount of the user's line-of-sight is equal to or less than a predetermined threshold value during 120 milliseconds. On the other hand, at the time of calibration data acquisition, the system control unit 50 determines that a gaze is detected in a case where the moving amount of the user's line-of-sight is equal to or less than the threshold value during three seconds. The predetermined threshold value of the moving amount of the line-of-sight may be decreased while the criterion time for gaze determination is maintained to 120 milliseconds, or the predetermined threshold value may be decreased with prolonged criterion time.

In step S410, the system control unit 50 determines whether the line-of-sight data E(X) determined in step S409 can be used as line-of-sight data (OK) or not (NG). In a case where the line-of-sight data E(X) can be used as line-of-sight data (OK) (YES in step S410), the processing proceeds to step S411. On the other hand, in a case where the line-of-sight data E(X) cannot be used as line-of-sight data (NG) (NO in step S410), the processing proceeds to step S416. Causes of NG determination of the line-of-sight data include natural light that is reflected by the eye or reflected by the lenses of glasses at the timing of when the determination operation is performed in step S403. There is also a case where the line-of-sight data E(X) suitable for calculating the calibration value in step S413 (described below) cannot be acquired because the user blinks a number of times.

In step S411, the system control unit 50 inputs X+1 to the variable X and stores the variable X in the system memory 52.

In step S412, the system control unit 50 refers to the system memory 52 to determines whether X is larger than a threshold value Xth (X>Xth). In a case where X>Xth (YES in step S412), the processing proceeds to step S413. On the other hand, in a case where X≤Xth (NO in step S412), the processing proceeds to step S414. The threshold value Xth indicates the number of gaze points for acquiring the line-of-sight data at the calibration. According to the present exemplary embodiment, Xth is 5 since five gaze points are displayed.

In step S413, the system control unit 50 calculates the calibration value, based on all of the line-of-sight data pieces E(X) acquired until the processing reaches this step. Then, the processing proceeds to step S415.

In step S414, the system control unit 50 hides the gaze points to be displayed in the EVF 29. Then, the processing returns to step S402. As described above, in control in the calibration mode according to the present exemplary embodiment, the gaze points as calibration display are sequentially displayed one by one, and only one gaze is displayed in the EVF 29 at a time. Therefore, the gaze points are hidden in this step.

In step S415, the system control unit 50 combines P(1) stored in step S407 and the calibration value calculated in step S413 as calibration data, and stores these data pieces in the nonvolatile memory 56 in an associated way. As described above, as the relative positional relation between the line-of-sight detection block 160 and the eye 161 changes, the position of the infrared light emitted from the infrared emitting diodes 166 and reflected by the eye 161 changes, and consequently the infrared light detected by the line-of-sight detection block 160 also changes. Thus, by storing the orientation of the line-of-sight detection block 160, i.e., by storing the orientation of the digital camera 100 and the user's line-of-sight data in an associated way, the user is able to perform position specification by the line-of-sight input having higher accuracy in a case where the user executes a function based on the line-of-sight input.

In a case where the orientation information P(1) is determined to be an unregisterable orientation (NO in step S406) or in a case where the line-of-sight data E(X) is determined to be NG (NO in step S410), then in step S416, the system control unit 50 displays a warning in the EVF 29. In a case where the orientation information P(1) is determined to be an unregisterable orientation (NO in step S406), a warning "Operate Camera in Horizontal Position or Vertical Position" is displayed. In a case where the line-of-sight data E(X) is determined to be NG (NO in step S410), a warning according to the cause of NG line-of-sight data E(X) is displayed. Example causes of NG line-of-sight data include a number of blinks, natural light reflected by the eye, and glasses covered by ghost. In these cases, the system control unit 50 displays "Keep Opening Both Eyes", "Do Not Blink When Pressing M-Fn Button", and "Raise Positions Of Glasses Before Bringing The Eye Close To Finder", respectively. The system control unit 50 also displays "Bring The Eye Close To Finder" and "Perform Calibration With Another Registration Number When Another Person Uses Camera Or When Glasses Are Put On Or Off". Displaying such warnings allows prompting the user to improve the camera orientation and eye conditions so that the line-of-sight data can be acquired. The system control unit 50 displays a warning in the EVF 29 while displaying the gaze points. The system control unit 50 may once hide the gaze points and then display a warning.

In step S417, like step S403, the system control unit 50 determines whether the determination operation is performed. In a case where the determination operation is performed (YES in step S417), the processing proceeds to step S418. On the other hand, in a case where the determination operation is not performed (NO in step S417), the processing proceeds to step S419.

In step S418, the system control unit 50 hides the warning displayed in step S416. Then, the processing returns to step S402. The system control unit 50 may hide the warning (a dialog 504 in FIG. 5H) displayed in step S416 when a predetermined time period has elapsed since the display is started, not based on the determination whether the determination operation is performed in step S417.

In step S419, like step S304, the system control unit 50 determines whether an operation other than the determination operation is performed. In a case where an operation other than a determination operation is performed (YES in step S419), the processing proceeds to step S420. On the other hand, in a case where an operation other than the determination operation is not performed (NO in step S419), the processing returns to step S417.

In step S420, the system control unit 50 discard the data acquired in the flowcharts in FIGS. 4A and 4B, i.e., the orientation information P(1) and the line-of-sight data E(X) of the digital camera 100 stored in the system memory 52. Then, the processing exits the control flowcharts in FIG. 3 and FIGS. 4A and 4B. In step S420, since an instruction for ending the data acquisition processing is received before completion of the line-of-sight data acquisition for all of the five gaze points, the system control unit 50 discards all of the acquired data. Then, the processing exits the control flowcharts in FIGS. 4A and 4B. In other words, since an instruction for ending the data acquisition processing is received before completion of a series of processing for calculating the calibration value based on the line-of-sight data for all of the five gaze points and storing the calculation value in association with the orientation information of the camera, the system control unit 50 discards all of the acquired data. The above-described control makes it possible to prevent the calibration value from being calculated regardless of the insufficient number of line-of-sight data pieces as line-of-sight information for calculating the calibration value. This enables avoiding the acquisition and storage of the low-accuracy calibration value, i.e., calibration data.

In a case where the orientation information P(X) for the X-th gaze point is determined to be different from the orientation information P(1) for the first gaze point (NO in step S408), the processing proceeds to step S421. In step S421, the system control unit 50 determines whether the flag information F is 1. In a case where the flag information F is 1 (YES in step S421), the processing proceeds to step S409.

On the other hand, in a case where the flag information F is not 1 (the flag information F is 0) (NO in step S421), the processing proceeds to step S422.

Figure 5H:
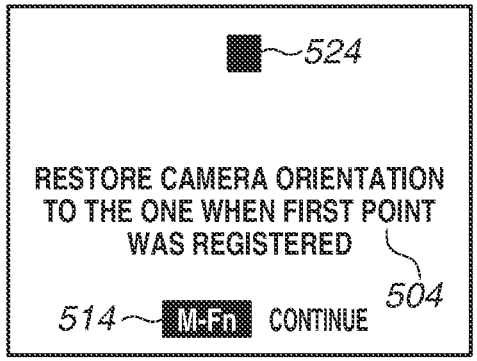

In a case where the orientation information P(X) for the X-th gaze point is determined to be different from the orientation information P(1) for the first gaze point (NO in step S408) and in a case where the flag information F is determined to be not 1 (NO in step S421), then in step S422, the system control unit 50 displays a warning. An example display is illustrated in FIG. 5H. The system control unit 50 displays a warning to notify the user that the current orientation is different from the orientation of the line-of-sight data acquired at the first gaze point. By displaying a warning such as the dialog 504 illustrated in FIG. 5H, the system control unit 50 is able to prompt the user to restore the orientation to the orientation of the line-of-sight data acquired at the first gaze point. According to the present exemplary embodiment, the system control unit 50 displays a warning while maintaining the display of a gaze point, as illustrated in FIG. 5H. Performing control in this way makes it unnecessary for the user to move the line-of-sight to search for a gaze point at a timing of when the dialog 504 is hidden. However, the system control unit 50 may perform control so that none of the gaze point and the warning is displayed in the EVF 29.

In step S423, the system control unit 50 determines whether the orientation of the digital camera 100 is restored. The system control unit 50 monitors output data of the orientation detection unit 55 to determine whether the same orientation information as P(1) is acquired. In a case where the same orientation information as P(1) is acquired (YES in step S423), the processing proceeds to step S426. On the other hand, In a case where the same orientation information as P(1) is not acquired (NO in step S423), the processing proceeds to step S424.

In step S424, like step S403, the system control unit 50 determines whether the determination operation is performed. In a case where the determination operation is performed, i.e., in a case where the M-Fn button 77 as a display item 514 in FIG. 5H is pressed (YES in step S424), the processing proceeds to step S425. On the other hand, in a case where the determination operation is not performed (NO in step S424), the processing returns to step S423.

In step S425, the system control unit 50 sets the flag information F to 1.

In a case where the determination operation is performed (YES in step S424), it can be considered that the user ignores the warning display and wants to continue the calibration with an orientation different from the orientation information P(1). Thus, in the following processing, the system control unit 50 can continue the acquisition of the line-of-sight data E(X) without repeating the warning display even in a case where the orientation information P(X) acquired in step S403 is different from the orientation information P(1) for the first gaze point. For example, in a case where P(1), P(2), and P(3) indicate the normal position, the orientation is changed to the left vertical position based on P(4), and the determination operation is performed in step S424 with the orientation set to the left vertical position, the system control unit 50 hides the warning, and the processing returns to step S402. In step S402, the system control unit 50 displays the fourth gaze point (X=4). Then, even in a case where the user performs the determination operation in step S403 with the orientation of the body of the digital camera 100 set to the left vertical position, the processing proceeds to step S409 from step S404 followed by NO in step S405 and YES in steps S408. In step S409, the system control unit 50 accumulates the line-of-sight data E(X) as the line-of-sight data corresponding to the X-th gaze point.

In this control, the line-of-sight data acquired and accumulated is degraded in accuracy for the orientation of the digital camera 100. However, this control enables reducing the burden of returning to the first gaze point even after completion of the calibration for up to the fourth gaze point. If the gaze point display after the orientation of the camera is changed is returned to the first gaze point (the gaze point displayed first), the user is highly likely to feel burdensome to start the calibration from the beginning. For this reason, the user may not use the line-of-sight input function or may use the line-of-sight input without performing the calibration. If the user uses the line-of-sight input without performing the calibration, a difference occurs between the user's line-of-sight and the line-of-sight position corresponding to the line-of-sight detected by the digital camera 100, causing the degradation of usability. As a result, an issue that the user does not use the line-of-sight input may arise. Therefore, while promoting the use of the line-of-sight input function, the system control unit 50 is able to prompt the user to perform the calibration for using the line-of-sight input having higher accuracy without feeling burdensome.

The system control unit 50 may repeat the determination processing in step S423 until the orientation of the digital camera 100 becomes equivalent to P(1) even in a case where the determination operation is performed. In this case, since the line-of-sight data in a case where the orientation of the body of the digital camera 100 is approximately equivalent to P(1) can be collected, calibration data having higher accuracy can be acquired and registered. This enables reducing the difference between the position currently being gazed by the user and the line-of-sight position corresponding to the line-of-sight calculated by the calibration.

In step S426, the system control unit 50 hides the warning displayed in step S422. Then, the processing returns to step S402.

After the image indicating the X-th gaze point is displayed, in a case where the system control unit 50 determines that the determination operation is not performed (NO in step S403), the processing proceeds to step S427. In step S427, like step S304, the system control unit 50 determines whether an operation other than the determination operation is performed. In a case where an operation other than the determination operation is performed (YES in step S427), the processing exits the control flowcharts in FIG. 3 and FIGS. 4A and 4B. On the other hand, in a case where an operation other than the determination operation is not performed (NO in step S427), the processing returns to step S403.

While, in the present exemplary embodiment, the determination operation is pressing of the M-Fn button 77, the determination operation is not limited to the depression of the M-Fn button 77. This is because the determination operation is a condition as a declaration of intent by the user to proceed to the following step (screen), as described above. An operation member having other functions that can be assigned the determination function is applicable. In a case where other operation members are to be used, the operability will further improve with an operation member disposed at a position where the user can operate the operation member while keeping the eye in proximity to the eyepiece 16 and gripping the grip portion 90 with the right hand. For example, the user is able to press an operation member disposed on the lens barrel as the exterior of the lens unit 150 with the left hand while keeping the eye in proximity to the eyepiece 16 and gripping the grip portion 90 with the right hand. The determination operation may be determined to have been performed when the user gazes a displayed gaze point, not when an operation member is pressed. More specifically, in addition to pressing of the M-Fn button 77, the determination operation may be determined to have been performed by the user in case where the user's line-of-sight gazing the gaze point displayed in the EVF 29 does not move to exceed a predetermined moving amount (i.e., the moving amount remains equal to or less than a predetermined threshold value) during a predetermined time period. In this control, the line-of-sight data is not determined until the user's line-of-sight becomes stable (until the user's line-of-sight is determined to be stable to such an extent that the line-of-sight data can be acquired). Thus, according to the present exemplary embodiment, there is a low possibility that the line-of-sight data E(X) is determined to be NG in step S410 in FIG. 4A.

The warning displayed in steps S416 and S422 may be an icon-based message instead of a text-based message. More specifically, the warning may be a change of the display format or display color of the EVF 29, blinking of the EVF 29, or a combination of both as long as a warning can be notified to the user. For example, the dialog 504 in FIG. 5H may blink or the background color of the EVF 29 may be differentiated from the background color for the gaze point display.

As described above, in a case where the orientation of the body changes during execution of the calibration, the present exemplary embodiment displays a warning, prompts the user to restore the orientation of the line-of-sight data determined for the first gaze point, and receives no line-of-sight data after the orientation change until an instruction is issued by the user. This control makes it possible to reduce the degradation of the line-of-sight data accuracy, and generate and acquire calibration data having higher accuracy. In a case where the determination operation is performed by the user, the system control unit 50 continuously display the gaze point displayed before the orientation change without restoring the first gaze point even in a case where the orientation changes. This enables reducing the possibility that the user finds it burdensome to perform the calibration. Accordingly, this control enables acquiring data in such a way that the user does not feel it burdensome to perform the calibration, while reducing the degradation of calibration data accuracy.

The above-described various control described to be performed by the system control unit 50 may be performed by one hardware component, or the entire apparatus may be controlled by a plurality of hardware components (for example, a plurality of processors and circuits) which share processing.

While various embodiments of the present disclosure have specifically been described based on certain exemplary embodiments, the present invention is not limited to these specific exemplary embodiments. Diverse embodiments not departing from the spirit and scope of the present invention are also included in the scope of the present disclosure. While the gaze points that are used in the calibration have a square shape, the gaze points may have any shape as long as the user is able to gaze the gaze points. The gaze points may be animations instead of stationary images. While the background of the gaze point display is a solid color, the background may change in color, display color gradations, or display a playback image or LV image. For example, to eliminate the need of performing the calibration a number of times at bright and dark places, the system control unit 50 may change the background color and luminance each time a plurality of gaze points is displayed. This enables the user to perform the calibration under various situations with a single calibration operation.

While the present exemplary embodiment has been described above centering on an example case of the digital camera 100 having the EVF 29, the present invention is not limited thereto. Embodiments of the present disclosure are also applicable to electronic apparatuses including an acquisition unit configured to acquire information about the user's line-of-sight. More specifically, embodiments of the present disclosure are applicable to apparatuses capable of displaying a gaze point for calibration on a display unit and detecting the user's line-of-sight gazing the display unit. The above-described exemplary embodiments may be suitably combined. According to the present exemplary embodiment, the eyepiece 16 having the EVF 29 and the line-of-sight detection block 160 are integrally configured. However, the present exemplary embodiment is also applicable to apparatuses that include a display unit and a line-of-sight detection unit as separate units and are configured to detect the user's line-of-sight by connecting these units. More specifically, embodiments of the present disclosure are applicable to personal computers, personal digital assistants (PDAs), mobile phone terminals including smart phones, tablet personal computers, portable image viewers, printer apparatuses having a display, digital photo frames, music players, game machines, electronic book readers, and wearable devices, such as head mount displays.

For example, in a case where an external line-of-sight detection device is connected to a personal computer, control according to the present exemplary embodiment is performed not with the orientation of the personal computer but with the orientation of the line-of-sight detection device. In the following case, acquisition of the user's line-of-sight data for the calibration is started in a state that the line-of-sight detection device is horizontally disposed, and is performed. In a case where the orientation of the line-of-sight detection device is changed from a horizontal position to a vertical position during the calibration, the present exemplary embodiment neither acquire nor store the user's line-of-sight data after the orientation of the line-of-sight detection device is changed to the vertical position.

Embodiments of the present disclosure are applicable not only to the body of an imaging apparatus but also to a control apparatus that communicates with the imaging apparatus (including a network camera) via wire lined or wireless communication to remotely control the imaging apparatus. Examples of apparatuses that remotely control an imaging apparatus include smart phones, tablet PCs, and desktop PCs. The control apparatus is able to remotely control the imaging apparatus by transmitting commands for instructing the imaging apparatus to perform various operations and settings to the imaging apparatus, based on operations and processing performed on the control apparatus side. The control apparatus may also be able to receive, via wire lined or wireless communication, a live view image captured by the imaging apparatus and display the live view image.

The above-described various control described to be performed by the system control unit 50 may be performed by one hardware component, or the entire apparatus may be controlled by a plurality of hardware components (for example, a plurality of processors and circuits) which share processing.

Other Exemplary Embodiments

Embodiments of the present disclosure can also be implemented by performing the following processing. More specifically, software (program) for implementing the functions of the above-described exemplary embodiments is supplied to a system or apparatus via a network or various types of storage media, and a computer (or central processing unit (CPU) or micro processing unit (MPU)) of the system or apparatus reads and executes the program code. In this case, the program and the storage medium storing the program are included in the present invention.

Various embodiments of the present disclosure make it possible to generate calibration data having higher accuracy.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

What is claimed is:

1. An electronic apparatus comprising:
at least one memory and at least one processor which function as:
a line-of-sight detection unit configured to detect a user's gaze position to a display screen;
an orientation detection unit configured to detect an orientation of a body including the display screen; and
a control unit configured to execute calibration data acquisition processing for gaze position calibration,
wherein, in the calibration data acquisition processing, the control unit controls the line-of-sight detection unit to detect user's gaze positions for a plurality of different positions respectively, and
wherein, in a case where a first orientation, which is an orientation of the body when a user's gaze position for a first position among the plurality of positions is detected, is different from an orientation of the body when a user's gaze position for a position different from the first position among the plurality of positions is detected during the calibration data acquisition processing, the control unit performs the control to display a warning for prompting the user to return a changed orientation of the body to the first orientation.

2. The electronic apparatus according to claim 1,
wherein, in the calibration data acquisition processing, detection of a user's gaze position for the first position among the plurality of positions is executed first,
wherein the control unit causes the orientation detection unit to detect the first orientation, which is an orientation of the body when a user's gaze position for the first position is detected, and
wherein, after that, in the calibration data acquisition processing, in a case where the orientation detection unit detect that the orientation is different from the first orientation, the control unit performs the control to display the warning for prompting the user to return the changed orientation of the body to the first orientation.

3. The electronic apparatus according to claim 1,
wherein, in the calibration data acquisition processing, the control unit commands that an index corresponding to one position be displayed on the display screen, and acquires a user's gaze position corresponding to the position by acquiring the user's gaze position detected by the line-of-sight detection unit during display of the index, and
wherein the control unit calculates calibration data from the plurality of user's gaze positions corresponding to the plurality of positions respectively.

4. The electronic apparatus according to claim 3,
wherein, when a second index corresponding to a second position among the plurality of positions is displayed, in a case where the first orientation, which is an orientation of the body detected by the orientation detection unit when a first index corresponding to the first position among the plurality of positions is displayed, is different from an orientation of the body detected by the orientation detection unit when the second index is displayed, the control unit performs the control to display the warning.

5. The electronic apparatus according to claim 4,
wherein the first position is a position where, among the plurality of positions, detection of a user's gaze position is executed first in the calibration data acquisition processing.

6. The electronic apparatus according to claim 5,
wherein, in the calibration data acquisition processing, by acquiring a user's gaze position detected by the line-of-sight detection unit in accordance with a predetermined user operation during display of an index corresponding to one position, the control unit acquires the user's gaze position corresponding to the position and causes the orientation detection unit to detect an orientation of the body corresponding to the position.

7. The electronic apparatus according to claim 6,
wherein, in the calibration data acquisition processing, the control unit stores the calculated calibrated data and information regarding an orientation of body when the user's gaze position is detected.

8. The electronic apparatus according to claim 5,
wherein, in a case where the orientation of the body detected by the orientation detection unit when the second index is displayed is different from the first orientation, the control unit performs the control not to acquire a user's gaze position corresponding to the second position.

9. The electronic apparatus according to claim 4, wherein, in response to the orientation of the body becoming the first orientation during display of the warning, the control unit performs control not to display the warning.

10. The electronic apparatus according to claim 4, wherein, in response to the orientation of the body becoming the first orientation during display of the warning, the control unit performs control not to display the warning and to detect the user's gaze position for the second position.

11. The electronic apparatus according to claim 1, wherein, in a case where a predetermined condition is satisfied without the changed orientation of the body returning to the first orientation after the warning is displayed, the control unit detects the user's gaze position to a position different from the first position even when the changed orientation of the body is different from the first orientation.

12. The electronic apparatus according to claim 11, wherein the predetermined condition is an operation on an operation member or a movement amount of the gaze position of the user during a predetermined time period being less than or equal to a predetermined threshold.

13. The electronic apparatus according to claim 1, wherein the control unit performs control so as to store the orientation of the body when the user's gaze position at the first position is detected in association with calibration data calculated based on information regarding the user's gaze position detected at each of a plurality of different positions.

\* \* \* \* \*